Sept. 23, 1924.

S. K. ALLISON

CULINARY VESSEL

Filed Jan. 18, 1922

1,509,697

Inventor
Sarah K. Allison,

By
G. Munne Talbert

Attorney

Patented Sept. 23, 1924.

1,509,697

UNITED STATES PATENT OFFICE.

SARAH K. ALLISON, OF MACOMB, ILLINOIS.

CULINARY VESSEL.

Application filed January 18, 1922. Serial No. 530,094.

*To all whom it may concern:*

Be it known that SARAH K. ALLISON, a citizen of the United States of America, residing at Macomb, in the county of McDonough and State of Illinois, has invented new and useful Improvements in Culinary Vessels, of which the following is a specification.

The object of the invention is to provide a relatively simple vessel adapted for culinary purposes and having its parts adapted for rearrangement or adjustment to enable it to be used for boiling and other purposes as the occasion may arise; and with this object in view the invention consists in a construction and combination of parts of which a preferred embodiment is shown in the accompanying drawings, wherein:—

Figure 1:
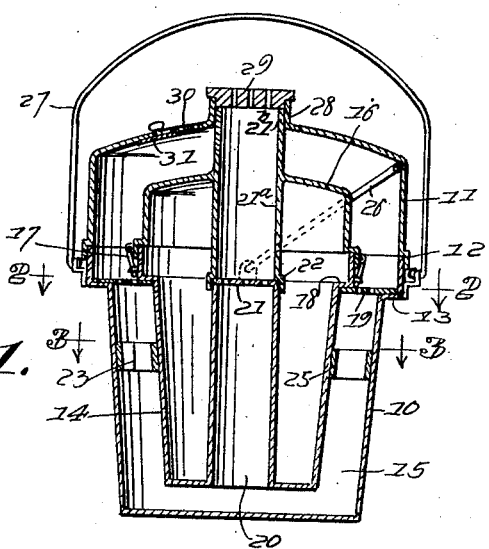

Figure 1 is a sectional view taken vertically of a vessel embodying the invention.

Figure 2:
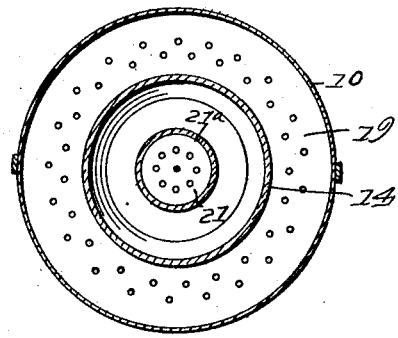
Figure 3:
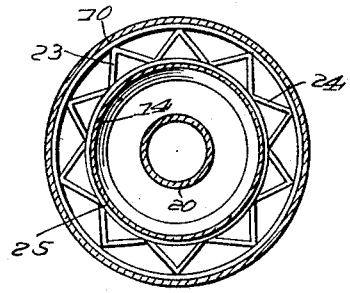

Figures 2 and 3 are cross sectional views thereof on the planes indicated respectively by the lines 2—2 and 3—3 of Figure 1.

The vessel includes an outer receptacle 10 of cylindrical or other appropriate form fitted with a removable cover 11 having a slip joint engagement at 12 with the upper edge of the receptacle which is preferably provided near its upper edge with an offset forming an inner shoulder 13, an inner receptacle 14 preferably concentric with and similar in shape to the outer receptacle and having its side and bottom walls spaced from those of the outer receptacle to form a water compartment 15, said inner receptacle having a cover 16 removably fitted upon the upper edge thereof and preferably secured by latches 17 to prevent the accidental displacement thereof, said inner receptacle having near its upper edge a lateral offset forming an exterior shoulder 18, and an annular screen 19 resting upon the inner annular shoulder of the outer receptacle and serving at its inner edge as a bearing for the exterior shoulder of the inner receptacle, to support or aid in supporting the latter within the former. The screen is perforated to permit of circulation of vapors, steam, etc., within the outer receptacle. Extending axially through the inner receptacle is an open ended circulating tube or drum 20 which may be fitted at its upper end with a screen or perforated diaphragm 21, and the cap or cover 16 of said inner receptacle is preferably provided with an extension 21$^a$ of said circulating tube or drum, also open at both ends and adapted at its lower end to engage the upper end of the main tube or drum through a slip joint 22.

The supplemental rest 23 of annular form and consisting of a zigzag strip 24 spacing a band 25 from the wall of the outer receptacle, may be provided to receive the inner receptacle in a plane between the said shoulders and the bottoms of the receptacles, the band being conical to correspond with the perforated downward taper of the inner receptacle to facilitate the upward displacement of the latter. To facilitate such displacement a pivotal bail or handle 26 is attached to the inner receptacle to be received when not in use by the cap or cover 11 of the outer receptacle which is also provided with a suitable bail or handle 27. A central opening or neck portion 28 of the cap or cover 11 is fitted with a removable plug or stropper or cap 29 which may be disposed when the concentration of heat within the outer receptacle is not desired, and a ventilator may also be employed in connection with said cap or cover to permit of a limited regulable escape of vapors therefrom, and as illustrated may consist of perforations and an adjustable valve or slide 31 for exposing or covering part or all of the perforations.

It is obvious that the tube or drum with its extension, extending axially through the inner receptacle at its cap or cover provides for the circulation of hot water and steam which materially facilitates the cooking of material in the inner receptacle,—assuming that the outer receptacle is employed as a water container or boiler, and such an arrangement is a substantial improvement over the double boilers heretofore used in securing a uniform treatment of the contents of the inner receptacle which, however, may readily be removed or displaced from the outer receptacle when the cooking operation has been completed or for giving access to the contents thereof.

Having described the invention, what is claimed as new and useful is:—

A double boiler comprising inner and outer receptacles, the former being supported in spaced relation within the latter, a circulating drum rising from the bottom of the inner receptacle with its lower end open and communicating with the outer receptacle and provided with a perforated upper end, separately removable covers respectively for said inner and outer receptacles, the outer cover having an opening the inner cover having a depending circulating drum having a telescopical fitting engagement with the upper perforated end of the first drum, the drum on the inner cover extending upwardly beyond the inner cover and having a fitting engagement with and through the opening in the outer cover, and a perforated plug closing the outer cover and the extension drum.

In testimony whereof she affixes her signature.

SARAH K. ALLISON.